US008185044B2

(12) United States Patent
Naden et al.

(10) Patent No.: US 8,185,044 B2
(45) Date of Patent: May 22, 2012

(54) MULTI-HOP LOAD BALANCING (75) Inventors: James Naden, Hertford (GB); Fiona Wilson, Spellbrook (GB)

(73) Assignee: Rockstar Bidco LP, New York, NY (US)

( * ) Notice: Subject to any disclaimer, the term of this patent is extended or adjusted under 35 U.S.C. 154(b) by 0 days.

(21) Appl. No.: 12/782,769

(22) Filed: May 19, 2010

(65) Prior Publication Data

US 2010/0227620 A1    Sep. 9, 2010

Related U.S. Application Data (63) Continuation of application No. 10/814,897, filed on Mar. 31, 2004, now abandoned.

(51) Int. Cl.
H04B 7/15 (2006.01)
H04B 7/00 (2006.01)
H04B 15/00 (2006.01)
H04W 72/00 (2009.01)

(52) U.S. Cl. ........ 455/11.1; 455/509; 455/450; 455/453

(58) Field of Classification Search ............ 455/561, 455/509, 435.2, 450, 453, 11.1
See application file for complete search history.

(56) References Cited

U.S. PATENT DOCUMENTS

| 4,670,899 | A | 6/1987 | Brody |
| 5,612,948 | A | 3/1997 | Fette |
| 6,330,458 | B1 | 12/2001 | Lamoureux |
| 6,775,251 | B1 | 8/2004 | Wiedeman |
| 6,934,511 | B1 | 8/2005 | Lovinggood |
| 7,583,968 | B2 * | 9/2009 | Kimura ................. 455/450 |
| 2003/0068975 | A1 | 4/2003 | Qiao |
| 2003/0195017 | A1 | 10/2003 | Chen |
| 2005/0143084 | A1 | 6/2005 | Cheng |

* cited by examiner

Primary Examiner — Andrew Wendell
(74) Attorney, Agent, or Firm — Barnes & Thornburg LLP (57) ABSTRACT A base station in a wireless communications system defines a plurality of beams which each have an amount of resources for supporting communication links with terminals. A control entity determines if a direct communication link can be supported between a new terminal and a base station using a first beam. If a direct communication link cannot be supported, a relaying equipment is used to provide a multi-hop path between the base station and the terminal. The multi-hop path comprises a link between the base station and the relaying equipment using resources of a different beam. This helps to redistribute load within the cell. The direct communication link can be refused if there are insufficient resources in the first beam, or if accepting the new terminal would cause quality of communication links with existing terminals to deteriorate.

40 Claims, 6 Drawing Sheets

MULTI-HOP LOAD BALANCING

RELATED APPLICATION

This application is a continuation of U.S. patent application Ser. No. 10/814,897, filed Mar. 31, 2004, and now abandoned.

FIELD OF THE INVENTION

This invention relates to wireless communications systems.

BACKGROUND TO THE INVENTION

In cellular wireless communications systems a limited range of resources are reused in different, spaced apart, cells. The resources vary according to the type of system, but are generally frequency channels, time slots on a bearer channel, spreading codes or combinations of these. Cells may be subdivided into sectors, with each sector being served by one or more beams formed by directional, higher gain, antennas. The directional antennas increase performance in the uplink and downlink directions by reducing interference, for example, and also help to increase capacity of the overall system as the resources allocated to one beam or sector can be reused in other beams or sectors. Each beam may use a sub-set of the overall resources of the cell or resources may be reused in different beams within the same cell.

One of the problems which can arise in cellular systems is that the total traffic demand of the terminals in a cell, sector or beam poorly matches the capacity of that cell, sector or beam. While system operators attempt to provision sufficient resources to meet the expected demand, there can be periods when a cell, sector or beam becomes overloaded to the extent that it cannot provide a service to a new terminal. Alternatively, providing service to a new terminal may seriously degrade the amount of resources available to be shared among the existing terminals, thus degrading their service level. A cell may become overloaded as a result of an event which causes a 'hot spot' of terminal activity in a particular localised area. The division of cells into sectors increases the likelihood of uneven loading and the division of sectors into beams further increases the likelihood of uneven loading. Averaging the traffic load over a larger area, through the use of a larger cell, tends to reduce the unevenness in load between different cells while reducing the area of the cell, dividing a cell into sectors or dividing a sector into beams gives rise to an increased variability in load in any one cell, sector or beam. Services which use a larger proportion of the resources, such as high data rate multimedia services, result in a lower number of users being supported and this also leads to a greater variability in load from cell to cell, sector to sector, beam to beam, or time to time in a given cell, sector or beam.

One known way of addressing this problem is to vary the effective width of a sector or beam if a neighbouring sector or beam is known to be overloaded. In this way, the resources of one sector can be used to supplement those of the overloaded sector. While this can more evenly match the load to the available capacity of the base station, it requires a more complicated and expensive antenna arrangement and control system at the base station.

In systems employing adaptive modulation and coding (AMC) combined with equal throughput scheduling (EQT) a further problem arises that cannot easily be addressed by adapting the beam shape provided by the base station. In such systems, terminals located in areas where the received signal strength, or signal to interference plus noise ratio, in the uplink or downlink directions is badly affected by propagation effects are allocated an increased share of the available resources. Although all terminals now receive an equal level of service this technique distributes a disproportionately large share of the resources to the affected terminals and results in a reduction in the aggregate capacity of the cell, sector or beam. Such badly located terminals are not often conveniently positioned to enable support form an adjacent cell, sector or beam and even when they are, the amount of resources required from the adjacent sector or cell will often be equally disproportionate.

Accordingly, the present invention seeks to improve service to terminals in cellular systems.

SUMMARY OF THE INVENTION

A first aspect of the present invention provides a control entity for a wireless communications system which comprises a plurality of base stations, each base station defining a plurality of beams which each have an amount of resources for supporting communication links with terminals located in the beams, and a relaying equipment, wherein the control entity is arranged to determine if a direct communication link can be supported between a new terminal and a base station using a first beam and, if the direct communication link cannot be supported, to invoke use of the relaying equipment to provide a first communication link between a base station and the relaying equipment using the resources of a second beam and a second communication link between the relaying equipment and the terminal whereby to provide a multi-hop path between the base station and the terminal.

Each beam defined by the base station may represent a sector. Alternatively, each beam may form one of a larger number of beams which together represent a sector. As a further alternative, the beams may exist independently of sectors, there not being any sectors as such, with the base station having a set of fixed or adaptive beams that are each allocated resources.

The invention is particularly applicable to systems where one beam (the first beam) is overloaded and has insufficient resources to support a direct communication link with the terminal. Preferably, the system is arranged to determine if the first beam has sufficient resources to support a direct communication link without reducing quality of communication for existing terminals served by the first beam below a predetermined limit. This can be achieved by determining an amount of resources required to support the direct communication link between the new terminal and the base station, determining a reduced amount of resources available to existing terminals served by the first beam if the base station were to accept the new terminal, and a quality of communication resulting from the reduced amount of resources.

It is not necessary that the first beam should overlap or be directly adjacent to the second beam. Indeed, it can be advantageous for the second beam to be spaced from the first beam by one or more intermediate beams of a common base station. Alternatively, the second beam can be defined by another base station in the system.

By using relay equipment in this way the resources of a neighbouring, more lightly loaded, beam can be used to support at least part of the communication path with the base station. Also, the antenna requirements of the base station do not need to be changed. The resources which support the second communication link can be reused on a frequent basis, e.g. for other beams at the base station, since they are only used on a localised basis.

The invention is particularly advantageous in systems which incorporate AMC/EQT as terminals that would normally require a disproportionate amount of resources to achieve a required service level, when supported directly from the base station in a given beam, may be supported from an alternative beam of the same or an alternative cell in a more efficient manner using a multi-hop path. Thus, the proportion of the resources that such a terminal requires may be lower in the alternative beam and hence the overall efficiency of the cell can be increased, enabling additional terminals to be supported.

It is preferred that where multiple candidate relay equipments are available in a system a relaying equipment is chosen which offers the best quality of communication. This allows a spectrally efficient modulation scheme to be used and minimises the amount of resources required. By choosing a path to the relay equipment with good propagation characteristics, the resources for the first communication link can also be minimised.

Normal resources of the cell, i.e. the channels which would normally be used for direct communication between a base station and terminals, may be reused for the link between the relaying equipment and the terminal, or some of the normal resources may be specifically reserved for this purpose. Using the normal resources of the cells has the advantage that the relaying equipments and terminals do not require additional equipment to support other frequency bands, modulation schemes or protocols.

The precise number of beams defined by each base station is unimportant. However, it will be appreciated that base stations having a large number of narrow beams will exhibit a greater degree of uneven beam loading, particularly for high rate services where the number of terminals supported is relatively low, and therefore such base stations will obtain particular advantage from this method.

The relaying equipment can be a permanent or temporary installation by the system operator, the end user of the terminal or a third party. The relaying equipment can be fixed or mobile. Some or all of the terminals may have relaying functionality.

The control entity can form part of a base station, a base station controller or a terminal in the system. Alternatively, the functionality of the control entity may be distributed between control entities in two or more of: a base station, a base station controller, a terminal and a relaying equipment in the system.

Another aspect of the present invention provides a method of establishing a connection between a new terminal and a base station in a wireless communications system, the system comprising a plurality of base stations, each base station defining a plurality of beams which each have an amount of resources for supporting communication links with terminals located in the beams, and a relaying equipment, the method comprising:

determining if a direct communication link can be supported between the new terminal and the base station using a first beam;

if the direct communication link cannot be supported, invoking use of the relaying equipment to provide a first communication link between a base station and the relaying equipment using the resources of a second beam and a second communication link between the relaying equipment and the terminal whereby to provide a multi-hop path between the base station and the terminal.

The functionality described here can be implemented in software, hardware or a combination of these. Accordingly, a further aspect of the invention provides a computer program product for use in a wireless communications system comprising a plurality of base stations, each base station defining a plurality of beams which each have an amount of resources for supporting communication links with terminals located in the beams, and a relaying equipment; the computer program product comprising a machine readable medium carrying instructions for causing a control entity to perform the steps of:

determining if a direct communication link can be supported between a new terminal and a base station using a first beam;

if the direct communication link cannot be supported, invoking use of the relaying equipment to provide a first communication link between a base station and the relaying equipment using the resources of a second beam and a second communication link between the relaying equipment and the terminal whereby to provide a multi-hop path between the base station and the terminal.

It will be appreciated that the software can be installed on the host apparatus (base station, base station controller, terminal, relaying equipment) at any point during the life of the equipment. The software may be stored on an electronic memory device, hard disk, optical disk or other machine-readable storage medium. The software may be delivered as a computer program product on a machine-readable carrier or it may be downloaded directly to the host via a network connection.

It will be apparent that the invention may be extended by including one or more additional relaying equipments in the multi-hop path between the relaying equipment and the terminal.

BRIEF DESCRIPTION OF THE DRAWINGS

Embodiments of the invention will be described with reference to the accompanying drawings in which.

DESCRIPTION OF PREFERRED EMBODIMENTS

Figure 1:
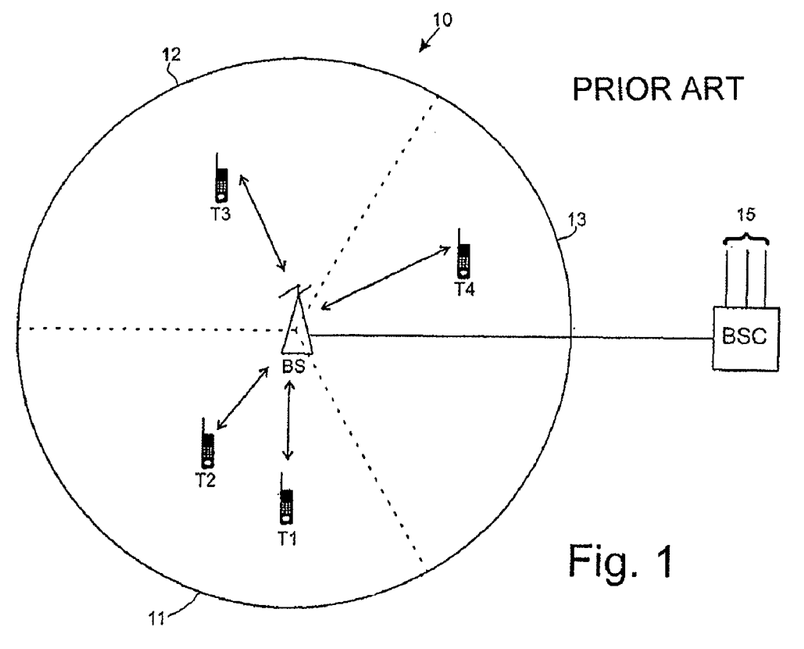
FIG. 1 shows a conventional wireless communications system.

FIG. 1 shows part of a cellular communications system. One cell 10 of the system is shown, served by a base station BS. The cell 10 is divided into three sectors 11, 12, 13. In a known manner, each sector is served by a separate antenna, or array of antennas, and other transmission equipment at the base station BS. For simplicity, it will be assumed that each sector is defined by a single beam generated by base station BS. Each sector (beam) 11, 12, 13 is allocated spectrum from the total available spectrum resources of the cell 10. The spectrum allocated to an individual sector may be a distinct sub-set of the total available to the cell or spectrum may be reused in other sectors of the cell. In the case of a third generation (3G) system such as UMTS-HSDPA, the resources comprise bearer channels at particular frequencies, each bearer channel being sub-divided into time slots. As terminals T1, T2 within a sector require service they are allocated resources to support uplink (terminal to base station) and downlink (base station to terminal) communication paths. The cellular communications system comprises many such cells 10. Control functions, such as radio resource management, may be provided by a dedicated entity external to the cell, such as a base station controller (BSC), which connects to a group of base stations.

The amount of spectrum resources allocated to a sector (beam) determines the total traffic capacity of the sector (beam). Terminals may have fixed data rates or may be capable of demanding a variable data rate, according to the amount of data that they need to send or receive. The total spectrum resources that are allocated to each sector are usually matched to the expected traffic demand in the sector. In FIG. 1, sector 11 supports communication links with terminals T1 and T2, sector 12 supports a communication link with terminal T3 and sector 13 supports a communication link with terminal T4. For the purpose of this example, it is to be considered that the resources allocated to sector 11 are only sufficient to support the traffic demands of terminals T1, T2. Thus, sector 11 is now heavily loaded (and unable to support further terminals) while sectors 12 and 13 are more lightly loaded. Although terminals T1-T4 are shown here as mobile handsets, it will be appreciated that they can be mobile or fixed wireless devices. The terminals can, for example, be a mobile telephone or computing device, or any other device which requires a wireless communication link.

Figure 2:
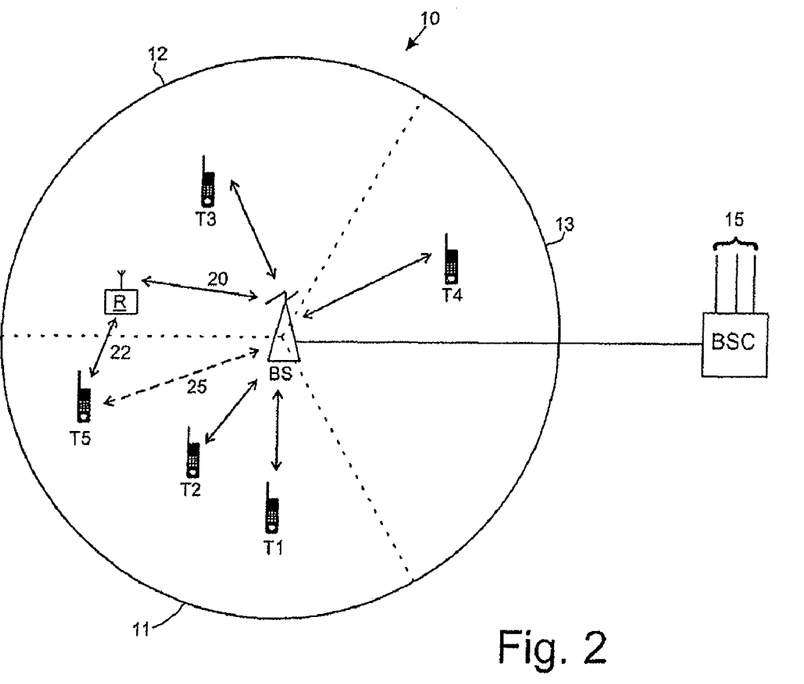
FIG. 2 shows the wireless communications system of FIG. 1 with the addition of a relay equipment supporting communication between sectors.

FIG. 2 shows the same cell 10 at a later time. Sectors 11, 12, 13 are still supporting communication links with the same terminals T1-T4. However, a new terminal T5, positioned within sector 11, also requires service. Sector 11 is unable to support the new terminal T5 as it is currently using all of it's allocated resources. Thus, a direct connection 25 is not possible. However, terminal T5 is serviced by the base station BS via a relay R positioned within the lightly loaded sector 12. A first communication link 20 connects base station BS and the relay R and a second communication link 22 connects the relay R and terminal T5. The first communication link and second communication link form a multi-hop link. In this way, the resources of the lightly loaded sector 12 are used for the majority of the path between the base station BS and terminal T5.

There are several ways in which the second communication link 22 can be achieved.

In a first way, the second communication link 22 uses resources of the lightly loaded sector (sector 12). This has an advantage that the heavily loaded sector (sector 11) is not burdened with providing any resources for the new terminal T5. However, this is only possible if the resources of the lightly loaded sector (sector 12) are distinct from the resources of the heavily loaded sector (sector 11), i.e. reuse of the resources used in the lightly loaded sector (sector 12) by the heavily loaded sector (sector 11) is not possible. In many cases where resources are reused in each sector this will not therefore be the preferred option.

In a second way, the second communication link 22 uses the resources of the heavily loaded sector 11. Again, this is only possible if the resources of the lightly loaded sector (sector 12) are distinct from the resources of the heavily loaded sector (sector 11), i.e. it is not possible to reuse the resources of the lightly loaded sector (sector 12) in the heavily loaded sector (sector 11). Furthermore, because the resources of the heavily loaded sector (sector 11) are already fully utilised for communication with terminals T1 and T2 the second communication link can only be realised if it can share resources with one of the links to terminals T1 or T2. This is possible if the link to either T1 or T2 from the base station is a good quality path and if the second communication link is also a good quality path, so that both the link to terminal T1 or T2 and the second communication link 22 can use a higher efficiency modulation scheme, which minimises the amount of resources required by each, thus enabling them to share the same resource. The added complexity of balancing the demands of multiple paths means that this will not be the preferred option in many cases.

In a third way, which is the preferred way, the second communication link uses a separate block of resources which are reserved for relay to terminal communications. Although this block of resources may be reserved in a separate part of the spectrum, e.g. at 2.4 GHz when the first communication link is at 900 MHz, this is not spectrally efficient as additional spectrum must be obtained and the terminals must be capable of multi-band operation. Preferably, the block of resources reserved for the second communication link is reserved from within the spectrum allocated to the first communication link, such as by reserving selected time slots or frequencies from those allocated. Therefore, the terminals do not need to be capable of operating in multiple bands. Reserving a block of resources for the second communication link reduces the resources available for the first communication link. However, this need not be a limitation because the resources used for the second link may be reused more frequently than those of the first communication link and can be reused within each sector. Hence the size of the reserved block can be relatively small. Furthermore, the choice of relay for a given terminal should be such that a high efficiency modulation scheme can be employed on the second communication link, further reducing the size of the reserved block required and improving the overall spectral efficiency.

The following example serves to illustrate the principles by which the spectral efficiency may be improved. A transmitter, e.g. a base station in the wireless cellular system, communicates with a first receiver, e.g. a mobile terminal in the wireless cellular system. Let the propagation environment be such that the spectral efficiency of the transmission from the base station to the first mobile terminal is six bits per second per Hertz. The base station also communicates with a second mobile terminal in the wireless cellular system. Let the propagation environment be such that the spectral efficiency of the transmission from the base station to the second mobile terminal is two bits per second per Hertz. This difference in spectral efficiency may arise due to the different locations of the two mobile terminals: for example, one may be nearer than the other to the base station or the terrain may be such that the signal strength received at the second mobile terminal is lower. If equal fractions of the available spectrum are allocated to each mobile terminal, the aggregate spectral efficiency will be (2+6)=4 bits per second per Hertz and the average spectral efficiency will be 2 bits per second per Hertz. In order to achieve equal throughput to both mobile terminals, a fraction equal to 2/(2+6)=¼ of the available spectrum must be allocated to the first mobile terminal and a fraction 6/(2+

6)=¾ to the second mobile terminal. The aggregate spectral efficiency is then ¼×6+¾×2=3 bits per second per Hertz and the average spectral efficiency is then 1.5 bits per second per Hertz. Thus, the throughput of the first mobile terminal has been reduced by more than the throughput of the second mobile terminal has been increased and hence the aggregate throughput is also reduced. A relay, which may be fixed or mobile, deployed by a network operator or by a subscriber, is now identified which is located such that good propagation conditions exist between it and the base station and between it and the second mobile terminal. Let the propagation environment be such that the spectral efficiency of the transmission from the base station to the relay and from the relay to the first mobile terminal is six bits per second per Hertz. The available spectrum must now be divided between three links: between the base station and the first mobile terminal, between the base station and the relay, and between the relay and the second mobile terminal. In order to achieve equal throughput to both mobile terminals, a fraction equal to 6/(6+6+6)=⅓ of the available spectrum must be allocated each link. The aggregate spectral efficiency is then ⅓×6+⅓×6=4 bits per second per Hertz for transmission to the mobile terminals and the average spectral efficiency is then 2 bits per second per Hertz. Thus, the use of a relay improves the spectral efficiency compared to merely adjusting the bandwidth allocated to each path.

Figure 3:
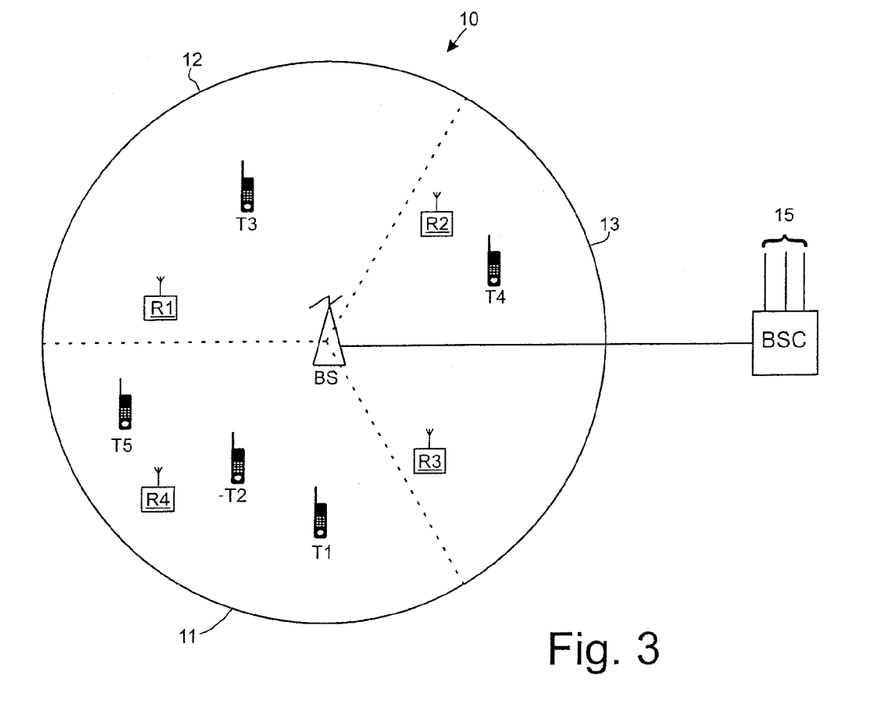
FIG. 3 shows the wireless communications system of FIG. 2 with multiple relay equipments for supporting communication between sectors.

FIG. 2 shows only one relay R. However, it is intended that a practical system would have a larger number of relays R. For example, a subset of the terminals may be suitably equipped to operate as relays. FIG. 3 shows a system with a larger number of relays (R1-R4) deployed within the cell 10. The relay can be a device which is deployed by the system operator, either permanently or on a temporary basis. Knowing the propagation characteristics and historical usage information of a cell can allow the system operator to deploy relays in positions where good quality links can be provided and where heavy traffic is expected. Sites which afford a good propagation path between the relay and base station, such as elevated sites, are particularly good. In FIG. 2 relays are deployed close to the boundaries between sectors which minimises the path length of the second communication link. Relays can also be devices which are deployed by an end user or a third party, and can be terminals which provide a relaying function.

Figure 4:
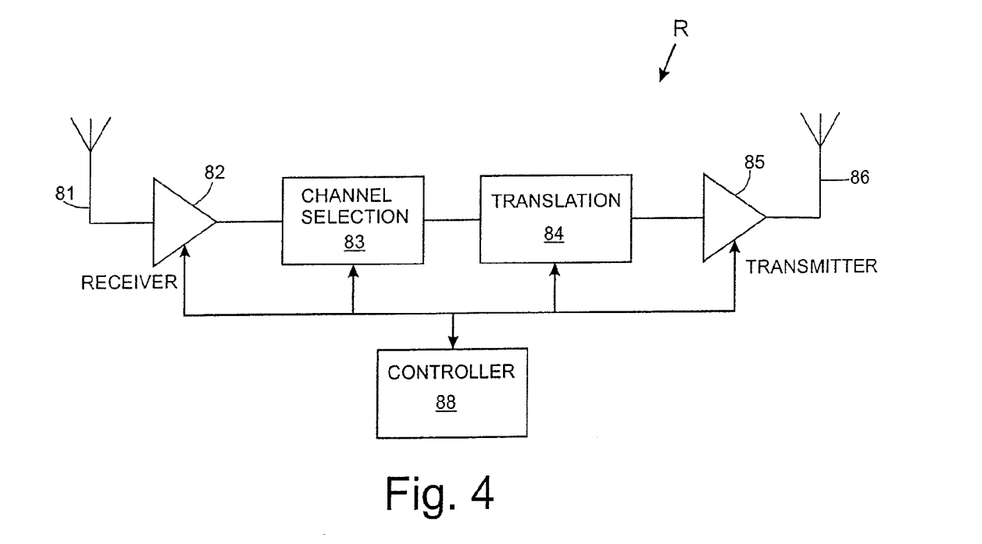
FIG. 4 shows the main functional blocks of a relay equipment.

The functional blocks of a relay are shown in FIG. 4. Each relay comprises an antenna 81 for detecting radio signals incident upon the relay and a receive stage 82 for receiving signals provided by the antenna. The received signals may be a subset of those detected by the antenna. Subsequently a channel selection stage 83 will select that channel corresponding to the desired signal, which will be the signal transmitted by the base station for the relay on the downlink or the one transmitted by the terminal for the relay on the uplink. As the relay cannot receive and transmit on the same channel, a signal received on one channel is translated to another channel before onward transmission. Depending on the type of system, the translation can include translating the received signal to a different frequency, time slot, modulation scheme or a combination of these. Therefore, the signal in this channel, once selected, will then progress to a translation stage 84 in which it will be translated onto another channel, which will be the channel for transmission to the base station by the relay on the uplink or the channel for transmission by the relay for the terminal on the downlink. The signal will then progress to a transmit stage 85 for transmission via an antenna 86. The transmit and receive antennas may, and often will be, the same such that the same antenna is used for reception and transmission. The relay also performs a controlled power amplification of the transmitted signal. A control function 88, such as a processor which executes control software, controls operation of the stages of the relaying equipment.

Figure 5:
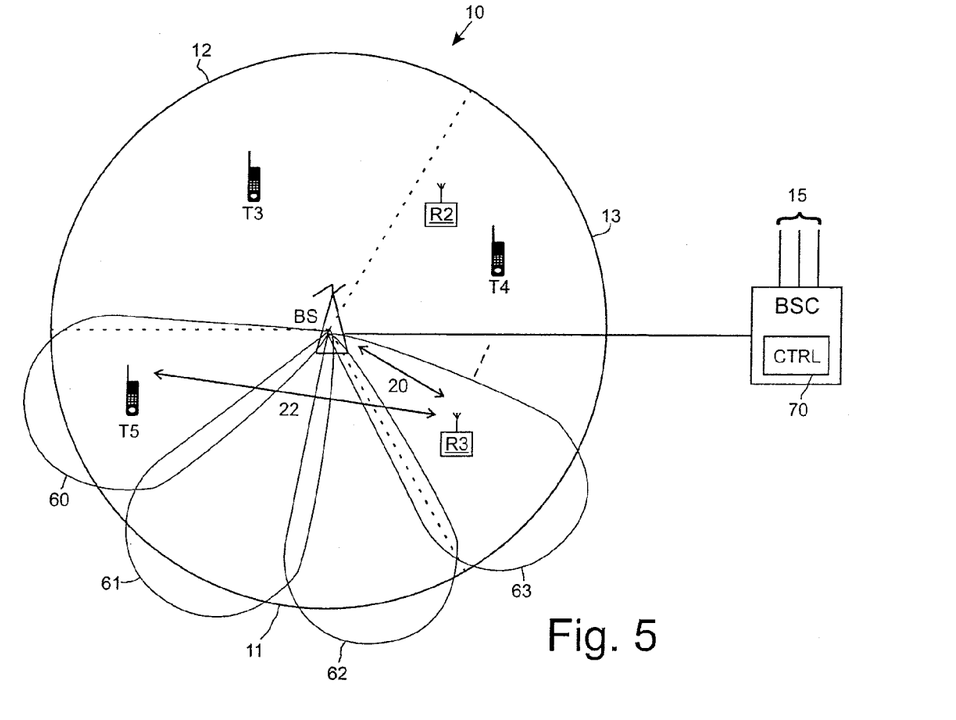
FIG. 5 shows the wireless communications system of FIG. 3 with multiple beams within each sector.

In the cell 10 shown in FIGS. 1 to 3 each of the sectors 11, 12, 13 can be served by a single beam from the base station BS or by a larger number of individual beams. FIG. 5 shows a set of three individual beams 60, 61, 62 serving sector 11. Other sectors are served by similar sets of beams and one of the beams of sector 13 is shown as beam 63. The set of beams can be fixed in terms of direction and beamwidth or they may be adaptable (in direction and/or beamwidth) under the control of the base station BS. It is not necessary for a terminal to be served by a relay which is positioned within a beam (or sector) which is directly adjacent to the terminal. In FIG. 5 terminal T5 is served by a relay R3. A first communication link 20 connects the base station BS to the relaying equipment R3 and a second communication link connects the relaying equipment R3 to the terminal T5. The use of a beam 63 is particularly advantageous when the base station forms multiple beams in each sector such that each beam is relatively narrow. In such cases the load on each beam is more variable due to the statistical nature of the terminal location. The ability to support a terminal T5 using a relay R3 positioned in a beam 63 which is separated from the beam 60 in which the terminal T5 is located by at least one intervening beam 61, 62 allows load balancing in a way that is considerably less complex than alternative techniques, such as adjusting the beam shape using adaptive antennas at the base station or techniques in which a first relay in the intervening beam is used to support the first terminal and a second relay in the next beam is used to support a second terminal in the intervening beam which has beam displaced by the need to support the first terminal.

Figure 6:
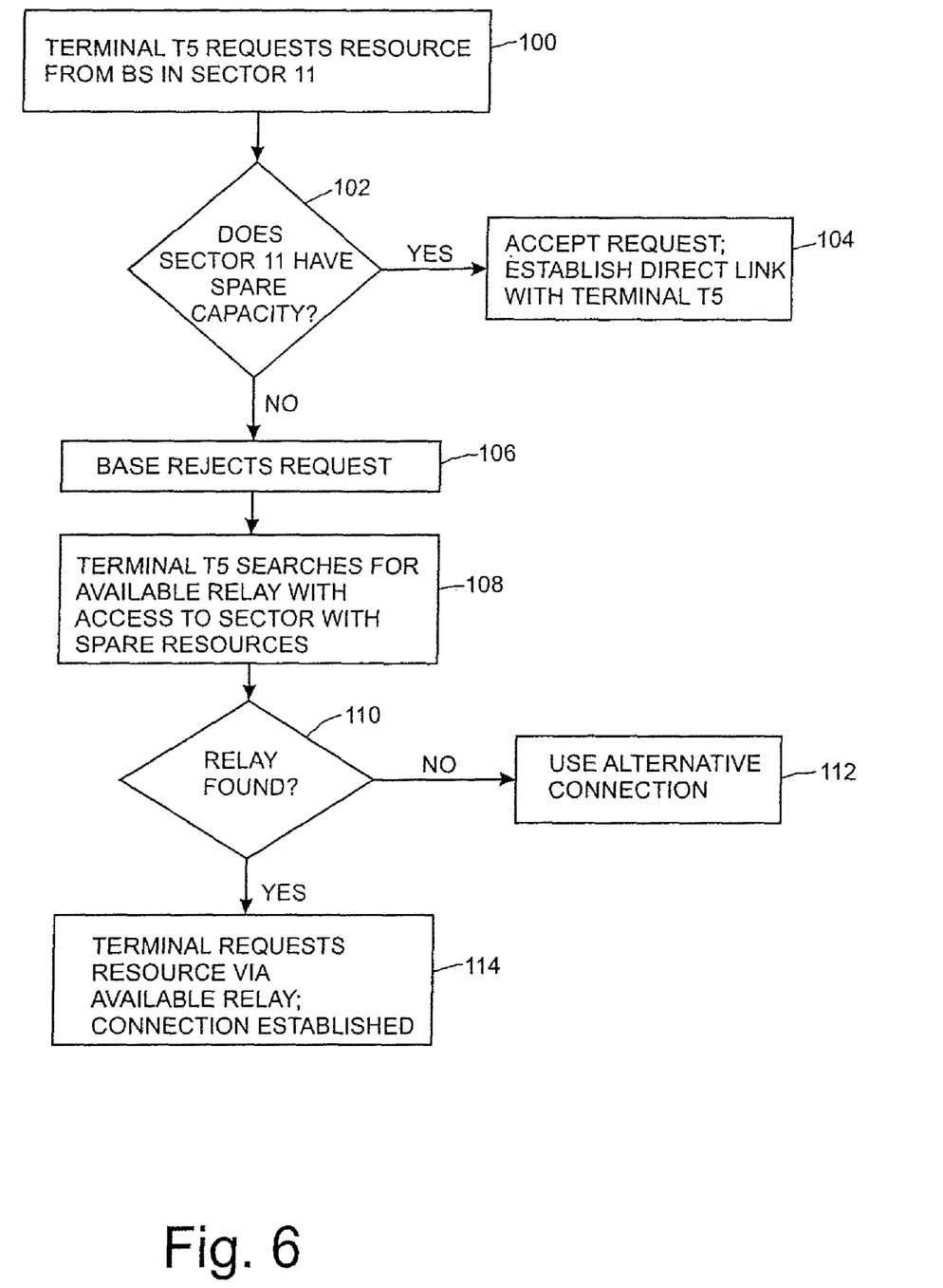
FIG. 6 shows the steps of a method in which a terminal selects a relay equipment to obtain service.

FIG. 6 shows one possible method of establishing a communication link between a terminal T5 and a base station using a relay. In this method, it is the terminal T5 which arranges the connection. Firstly, at step 100, the terminal T5 requests service from the base station BS using a signalling channel. The signalling channel may be the normal signalling channel which is specific to the sector 11 or to the cell 10. The request may specify the data rate required by the terminal. At step 102 a control entity at the base station, or base station controller BSC, determines whether there is sufficient spare capacity in sector 11 to accept the new connection. If there is sufficient capacity in sector 11, the terminal is accepted and a direct connection with the terminal is established in a normal manner (step 104). However, if the base station is heavily loaded and has insufficient capacity to accept the new connection, the base station BS denies service via sector 11 (at step 106). A decision of whether to accept a new connection can be made by calculating what effect accepting the new connection would have on existing connections. A determination is made of how much resource ($R_{new}$) would be required to support the new terminal at an acceptable quality level. All existing connections would need to have their resource allocations reduced by a portion of ($R_{new}$) to accommodate the new connection. If the resulting resource allocation for the existing connections is insufficient to maintain a predetermined quality of service, then the new connection will be rejected.

At step 108 the terminal searches for an available relay which can be used to provide a multi-hop connection to the base station. Terminal T5 may achieve this by using signalling channels that are reserved for use by the relays. If no available relay is found (step 112) then the terminal may be denied access to the cellular system. In a system with multiple relays, such as that shown in FIG. 3, several candidate relays may be found. In FIG. 3, relays R1, R3 and R4 are likely to be candidate relays. R4 is positioned within the same heavily loaded sector 11 and so is unlikely to be a good candidate. At this stage it is not necessary for the terminal T5 to know the location of each candidate relay i.e. which beam or sector they are served by. In order for a relay to forward a signal from the terminal T5 to the base station it must first establish a link with the base station. If no resources are available in the sector in which the relay is positioned, as is likely to be the case for relay R4 which is in the heavily loaded sector 11, then the relay cannot form a link to the base station and must remove itself from the candidate set of relays. Only relays which can form a link to the base station will thus remain in the candidate set of relays. It is advantageous that a relay is selected which allows the first communication link and second communication link to make the most efficient use of available resources. This typically means selecting a candidate relay which is positioned most closely to the terminal, although this is not necessarily the case, and will typically mean selecting a relay such that the quality of the signals on the first and second communication links is highest of those in the candidate set. Alternatively, a method such as that described in U.S. patent application Ser. No. 10/456,249 can be used in which each relay determines for itself whether or not to take part in a given communication according to the quality of the signals it receives.

Figure 7:
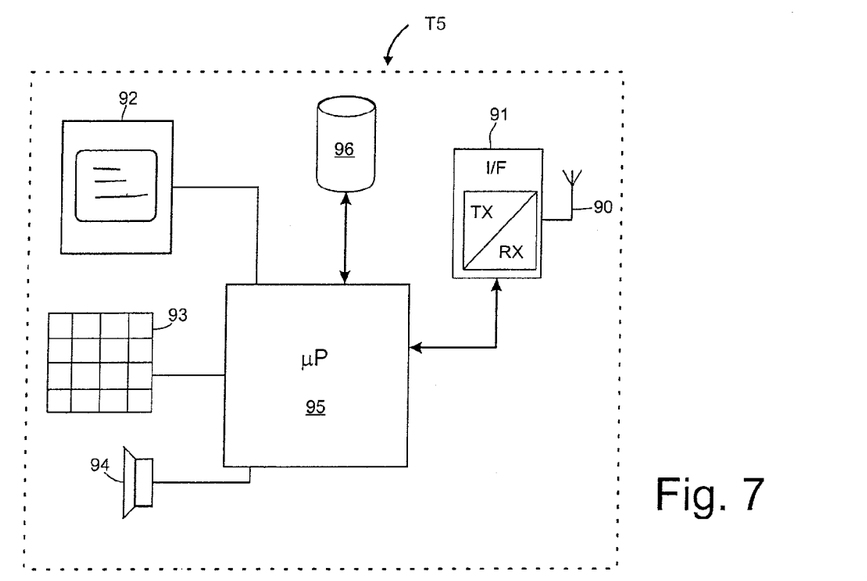
FIG. 7 shows the main functional blocks of a terminal.

FIG. 7 shows the main functional blocks within terminal T5. An antenna 90 connects to a transmission/reception stage 91 with modulation/demodulation and coding/decoding functions appropriate to the transmission scheme used in the wireless network. A controller 95 controls operation of the terminal. Control software resides on non-volatile memory 96 and this software includes code for performing the method just described. The terminal has a user interface with an input device 93, such as a keypad, a display 92 and an audio speaker 94.

Figure 8:
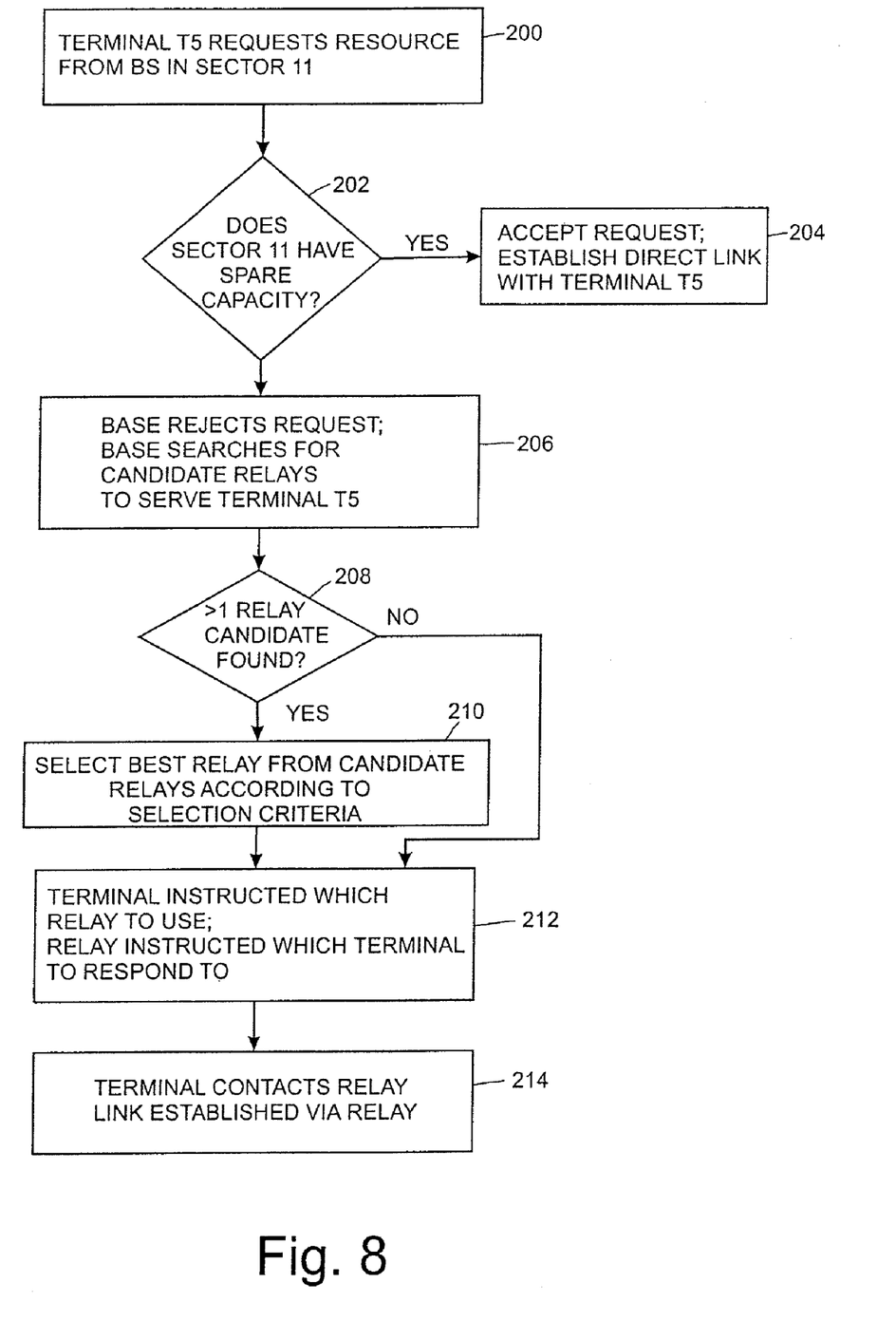
FIG. 8 shows the steps of a method in which the base station selects a relay equipment to support service between a terminal and the base station.

FIG. 8 shows another possible method of establishing a communication link between a terminal T5 and a base station using a relay. In this method, it is the base station BS or a controller 70 at the base station controller BSC which assumes responsibility for arranging the connection. Firstly, at step 200, the terminal T5 requests service from the base station BS using the normal signalling channels. At step 202 a control entity at the base station, or base station controller, determines whether there is sufficient spare capacity in sector 11 to accept the terminal. If there is sufficient capacity in sector 11, the terminal is accepted and a direct connection with the terminal is established in a normal manner (step 204). However, if the base station is heavily loaded and has insufficient capacity to accept the new connection the base station BS denies service at step 206. Although the base station BS denies service, it then takes responsibility for arranging which relay the terminal should use to access the network. The control entity determines the loading of neighbouring sectors 12, 13 and determines whether one of those has sufficient capacity to support a link with a relay. If a suitable sector is found, the control entity then finds the best relay within that sector. This can be achieved by signalling to relays and inviting them to respond, or by use of a list of available relays, stored centrally by the system. If several candidate relays are available (step 208) a relay is selected which allows the first communication link and second communication link to make the most efficient use of available resources. The control entity selects a relay to support communication. It then instructs the relay which terminal requires support and instructs the terminal T5 which relay is to serve the terminal (steps 212, 214).

In the above methods it is described how a relay is chosen according to the quality of the link that it can provide. The quality of a link is determined by a number of factors, which may include distance between the source and destination (which determines the path attenuation), obstacles between the source and destination, interfering sources using the same resources, atmospheric conditions and so on and may be measured in for example the signal to interference and noise ratio on the respective link.

Figure 9:
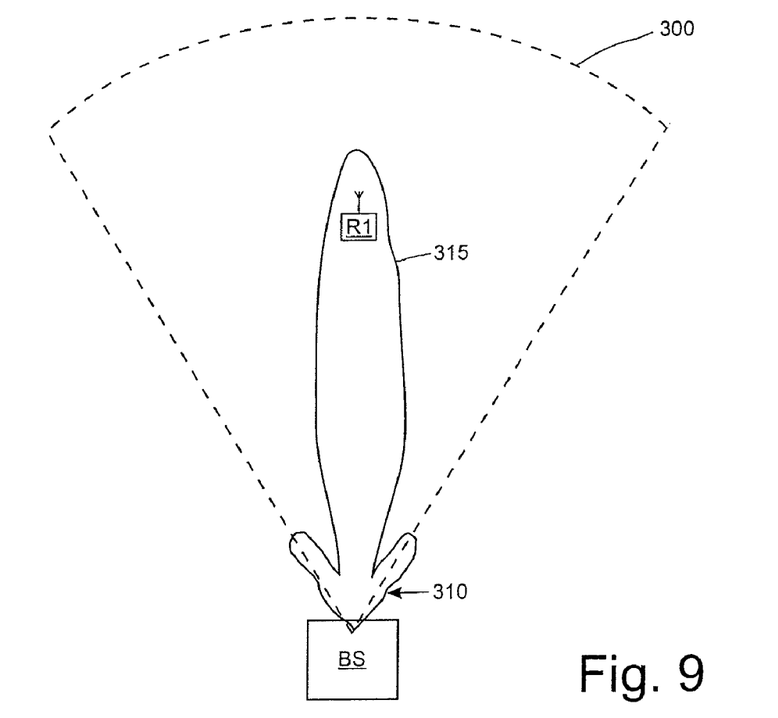
FIG. 9 shows one sector of a cell in which the base station modifies it's radiation pattern to select one relay equipment.

The base station BS can use one of several schemes to provide the first communication link between itself and the relay. Firstly, it can use a conventional antenna beam pattern which covers the entire sector (e.g. sector 12). A modulation scheme is selected with a spectral efficiency which is appropriate to the quality of the propagation path between the base station BS and relay. Similarly, a transmit power is selected which is appropriate to the propagation path. The power should be high enough to ensure an acceptable link quality but low enough so as not to cause undue interference with other users. In a second scheme for providing the first communication link, shown in FIG. 9, the base station adapts it's beam pattern 310 such that a main lobe 315 is directed towards the relay. Preferably, the main lobe 315 has a much narrower angle than the sector 300. Directing a beam in this way requires knowledge of the position of the relay with respect to the base station. For relays deployed by the system operator, position information will be readily available. For non-system deployed relays, position information is required. This can be obtained, for example, from the direction of arrival of signals from the relay on the uplink, as this will usually be sufficiently accurate for this purpose even though a small difference may exist between the frequencies used for the uplink and downlink signals, e.g. in an FDD system.

Figure 10:
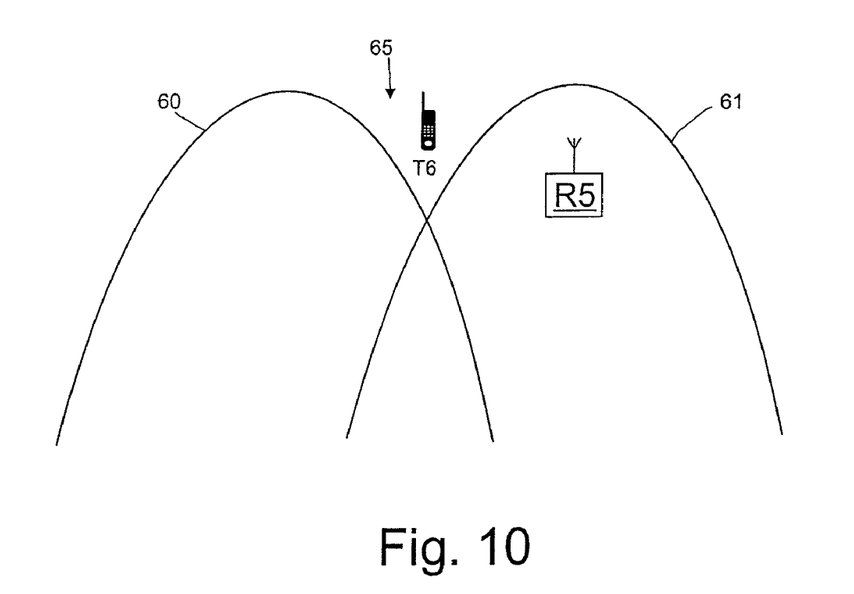
FIG. 10 shows how a terminal positioned in the cusped region between two adjacent beams can be served.

A known problem that can arise when beam-forming is used in isolation, i.e. when the base station forms multiple beams without knowledge of the position of terminals, is that some terminals are located disadvantageously on the cusp of the beam pattern such that they are located between two beams and are not strongly served by either. FIG. 10 shows two beams 60, 61. Terminal T6 is positioned in the cusped region 65 between the beams. Interference arising from adjacent beams can be relatively high in such cases, giving rise to a particularly low signal to interference ratio for such terminals. In referring to resources for these terminals we mean signal power as there will be insufficient signal power received at the terminal on the downlink or at the base station on the uplink even though there may be spectrum available. According to our method a relay located towards the peak of a beam may receive a high quality signal from the base station and the base station may similarly receive a high quality signal from the relay. A terminal disadvantageously located in the cusp of a beam with respect to communication with the base station may also achieve high quality communication with the relay such that a high quality multi-hop path is formed between the terminal and the base station. Such a relay would be preferentially selected for this terminal by our method which is based on signal quality. In so doing, our method therefore adapts the coverage pattern of a fixed beam antenna to suit the distribution of terminals without the need for a complex adaptive antenna at the base station and furthermore is not limited by the degrees of freedom available to the antenna, i.e. the ability of the antenna to form multiple beams and control its beam shape. The combination of beam forming with our method is therefore particularly powerful.

While the above examples show a single relay connecting a terminal with the base station, giving a total of two 'hops', multiple relays can be used, either in series or in parallel, giving a higher number of hops. Where more than one relay is included in a path in series the length of each hop will generally be reduced and in any case the minimum link quality of the hops forming the path will be improved as the number of hops is increased. When more than one relay is included in a path in parallel, more than one path will exist between the terminal and the base station, each path being composed of one or more hops. The combination of the signals arriving at the destination from the multiplicity of parallel paths will give rise to an improvement in combined signal quality due to diversity as poor quality conditions on one path will often be compensated for by better quality conditions on another.

The invention is not limited to the embodiments described herein, which may be modified or varied without departing from the scope of the invention.

We claim:

1. A control entity for a wireless communications system which comprises a plurality of base stations, the wireless communications system being configured to use adaptive modulation with equal throughput (EQT) scheduling, each base station defining a plurality of beams which each have an amount of resources for supporting communication links with terminals located in the beams, and a relaying equipment, wherein the control entity is arranged to:

determine a reduced amount of resources that would be allocated, as a result of operation of adaptive modulation with equal throughput (EQT) scheduling, to existing terminals served by a first beam defined by a first base station of the plurality of base stations, if the first base station were to accept a new terminal;

determine a quality of communication for said existing terminals resulting from operation of adaptive modulation in view of the reduced amount of resources, and thereby determine if the first beam has sufficient resources to support a direct communication link between the new terminal and the first base station, if the direct communication link were established by allocating a portion of resources used by existing terminals to the new terminal without reducing the quality of communication for existing terminals served by the first beam below a predetermined limit; and,     if the first beam does not have said sufficient resources, to invoke use of the relaying equipment to provide a first communication link between a base station defining a second beam and the relaying equipment using the resources of the second beam and a second communication link between the relaying equipment and the terminal whereby to provide a multi-hop path between the base station defining the second beam and the new terminal.

2. A control entity according to claim 1 wherein the first beam and the second beam are defined by the same base station.

3. A control entity according to claim 2 wherein the first beam and the second beam are separated by at least one intermediate beam of the base station.

4. A control entity according to claim 1 wherein the first base station defines a plurality of sectors and the plurality of beams defined by the first base station have a width which is narrower than the width of the sectors.

5. A control entity according to claim 1 which is arranged to adapt the shape of the second beam to serve the relaying equipment.

6. A control entity according to claim 1 which is arranged to determine an amount of resources required to support the direct communication link between the new terminal and the base station.

7. A control entity according to claim 1 wherein the base station uses equal throughput scheduling (EQT).

8. A control entity according to claim 1 wherein the control entity is further arranged to select a relaying equipment, from a plurality of candidate relaying equipments, to provide the multi-hop path.

9. A control entity according to claim 8 wherein the control entity is arranged to select a relaying equipment on the basis of the quality of the first communication link that the relaying equipment can provide.

10. A control entity according to claim 8 wherein the control entity is arranged to select a relaying equipment on the basis of the quality of the second communication link that the relaying equipment can provide.

11. A control entity according to claim 8 wherein the control entity is arranged to select a relaying equipment on the basis of distance between the relaying equipment and the new terminal.

12. A control entity according to claim 8 wherein the control entity selects a relaying equipment in order to compensate for the shape of a beam.

13. A control entity according to claim 1 wherein the second communication link uses the resources of the first beam.

14. A control entity according to claim 1 wherein the second communication link uses the resources of the second beam.

15. A control entity according to claim 1 wherein the second communication link uses resources which are separate from those allocated to each beam for direct communication with terminals.

16. A control entity according to claim 1 which is part of the base station or a base station controller.

17. A control entity according to claim 1 which is part of the terminals or relaying equipment.

18. A base station for a wireless communications system including a control entity according to claim 1.

19. A base station controller for a wireless communications system including a control entity according to claim 1.

20. A terminal for a wireless communications system including a control entity according to claim 1.

21. A control entity according to claim 1, wherein the base station uses adaptive modulation and coding (AMC).

22. A control entity according to claim 21, wherein the control entity is arranged to invoke use of the relay equipment dependent on a determination that the proportion of the resources of the second beam that the first communication link requires being lower than the proportion of resources of the first beam that would be required for the direct communication link.

23. A method of establishing a connection between a new terminal and a base station in a wireless communications system configured to use adaptive modulation with equal throughput scheduling, the system comprising a plurality of base stations, each base station defining a plurality of beams which each have an amount of resources for supporting communication links with terminals located in the beams, and a relaying equipment, the method comprising:

determining a reduced amount of resources that would be allocated, as a result of operation of adaptive modulation with equal throughput scheduling, to existing terminals served by a first beam defined by a first base station of the plurality of base stations, if the first base station were to accept a new terminal;

determining a quality of communication for said existing terminals resulting from operation of adaptive modulation in view of the reduced amount of resources, and thereby determining if the first beam has sufficient resources to support a direct communication link between the new terminal and the first base station, if the direct communication link were established by allocating a portion of resources used by existing terminals to the new terminal, without reducing the quality of communication for existing terminals served by the first beam below a predetermined limit; and if the first beam does not have said sufficient resources, invoking use of the relaying equipment to provide a first communication link between a base station defining a second beam and the relaying equipment using the resources of the second beam and a second communication link between the relaying equipment and the new terminal whereby to provide a multi-hop path between the base station defining the second beam and the new terminal.

24. A method according to claim 23 wherein the first beam and the second beam are defined by the same base station.

25. A method according to claim 24 wherein the first beam and the second beam are separated by at least one intermediate beam of the base station.

26. A method according to claim 23 further comprising adapting the shape of the second beam to serve the relaying equipment.

27. A method according to claim 23 further comprising:
determining an amount of resources required to support the direct communication link between the new terminal and the base station.

28. A method according to claim 23 wherein the base station uses equal throughput scheduling (EQT).

29. A method according to claim 23, the method further comprising selecting a relaying equipment, from a plurality of candidate relaying equipments, to provide the multi-hop path.

30. A method according to claim 29 wherein the selecting step selects a relaying equipment on the basis of the quality of the first communication link that the relaying equipment can provide.

31. A method according to claim 29 wherein the selecting step selects a relaying equipment on the basis of the quality of the second communication link that the relaying equipment can provide.

32. A method according to claim 29 wherein the selecting step selects a relaying equipment on the basis of distance between the relaying equipment and the new terminal.

33. A method according to claim 29 wherein the selecting step selects a relaying equipment in order to compensate for the shape of a beam.

34. A method according to claim 23 wherein the second communication link uses the resources of the first beam.

35. A method according to claim 23 wherein the second communication link uses the resources of the second beam.

36. A method according to claim 23 wherein the second communication link uses resources which are separate from those allocated to each beam for direct communication with terminals.

37. A method according to claim 23, wherein the base station uses adaptive modulation and coding (AMC).

38. A method according to claim 37, the method comprising invoking use of the relay equipment dependent on a determination that the proportion of the resources of the second beam that the first communication link requires being lower than the proportion of resources of the first beam that would be required for the direct communication link.

39. A computer program product embodied in a non-transitory computer readable medium for use in a wireless communications system comprising a plurality of base stations, the wireless communications system being configured to use adaptive modulation with equal throughput scheduling, each base station defining a plurality of beams which each have an amount of resources for supporting communication links with terminals located in the beams, and a relaying equipment; the computer program product comprising a non-transitory machine readable medium carrying instructions for causing a control entity to perform the steps of:

determining a reduced amount of resources that would be allocated, as a result of operation of adaptive modulation with equal throughput scheduling, to existing terminals served by a first beam defined by a first base station of the plurality of base stations if the first base station were to accept a new terminal;

determining a quality of communication for said existing terminals resulting from operation of adaptive modulation in view of the reduced amount of resources, and thereby determining if the first beam has sufficient resources to support a direct communication link between the new terminal and the first base station, if the direct communication link were established by allocating a portion of resources used by existing terminals to the new terminal, without reducing the quality of communication for existing terminals served by the first beam below a predetermined limit; and if the first beam does not have said sufficient resources, invoking use of the relaying equipment to provide a first communication link between a base station defining a second beam and the relaying equipment using the resources of the second beam and a second communication link between the relaying equipment and the terminal whereby to provide a multi-hop path between the base station defining the second beam and the new terminal.

40. A control entity for a wireless communications system which comprises a plurality of base stations, the wireless communications system being configured to use adaptive modulation with equal throughput scheduling, each base station defining a plurality of beams which each have an amount of resources for supporting communication links with terminals located in the beams, and a relaying equipment, the control entity comprising:

means for determining a reduced amount of resources that would be allocated as a result of operation of adaptive modulation with equal throughput scheduling, to existing terminals served by a first beam defined by a first base station of the plurality of base stations if the first base station were to accept a new terminal;

means for determining a quality of communication for said existing terminals resulting from operation of adaptive modulation in view of the reduced amount of resources, and thereby determining if a first beam has sufficient resources to support a direct communication link between the new terminal and the first base station, if the direct communication link were established by allocating a portion of resources used by existing terminals to the new terminal, without reducing the quality of communication for existing terminals served by the first beam below a predetermined limit; and means for invoking, if the first beam does not have said sufficient resources, use of the relaying equipment to provide a first communication link between a base station defining a second beam and the relaying equipment using the resources of the second beam and a second communication link between the relaying equipment and the terminal whereby to provide a multi-hop path between the base station defining the second beam and the new terminal.

* * * * *